No. 686,212. Patented Nov. 5, 1901.
A. DUPPLER.
MECHANISM FOR OPERATING BRAKES.
(Application filed Aug. 10, 1899. Renewed Apr. 8, 1901.)
(No Model.)

WITNESSES:
M. J. Sanchez
M. Turner

Anton Duppler
INVENTOR

BY
Benjamin Price
ATTORNEY

UNITED STATES PATENT OFFICE.

ANTON DUPPLER, OF JERSEY CITY, NEW JERSEY, ASSIGNOR, BY DIRECT AND MESNE ASSIGNMENTS, TO COMPOUND MAGNET BRAKE COMPANY, A CORPORATION OF NEW JERSEY, AND MAGNET CAR BRAKE COMPANY, A CORPORATION OF NEW JERSEY.

MECHANISM FOR OPERATING BRAKES.

SPECIFICATION forming part of Letters Patent No. 686,212, dated November 5, 1901.

Application filed August 10, 1899. Renewed April 8, 1901. Serial No. 54,927. (No model.)

*To all whom it may concern:*

Be it known that I, ANTON DUPPLER, a citizen of the United States, residing at Jersey City, Hudson county, New Jersey, have invented a new and useful Mechanism for Operating Brakes for Cars or other Vehicles, of which the following is a full description.

The accompanying drawings illustrate the invention, of which—

Figure 1:
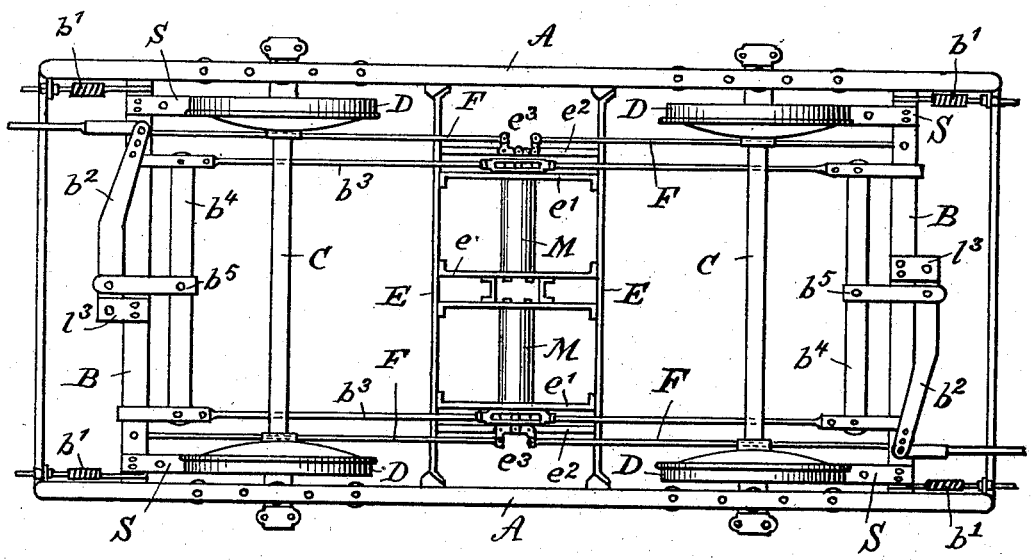
Figure 2:
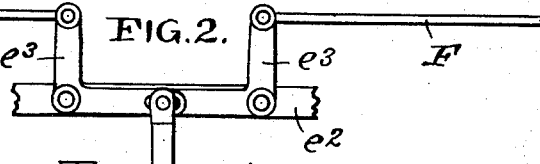
Figure 2:
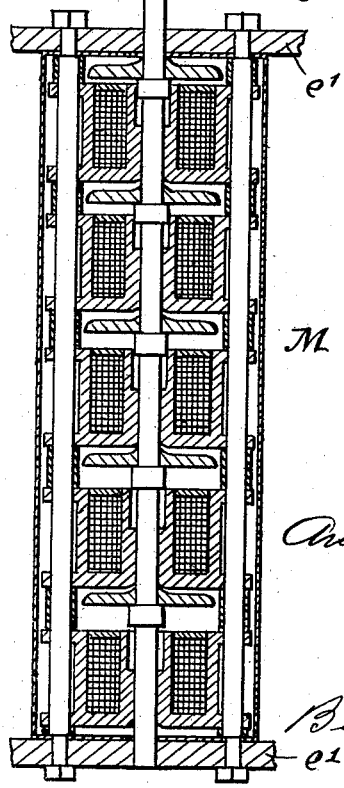

Figure 1 shows a plan view of the body of a car with the brake and operating mechanism therefor in place; Fig. 2, a view of a combination-magnet employed to actuate the brake.

A is the framework of a car-body, constructed in the usual way, C the axles, and D the wheels.

B B are cross-pieces of a frame constructed in the usual way and carry the brake-shoes. The ends of the rods $b^3$ rest upon cross-pieces B and are connected by the cross-pieces $b^4$.

$b^2$ is a lever having a connection with the platform of the car within reach of the driver. The end of this lever is pivoted to a projection $l^3$, secured to the cross-piece B. A link $b^5$ connects this cross-piece to the lever $b^2$. At the ends of the cross-pieces B are the brake-shoes which operate upon the wheels D. $b'$ represents springs which restore the parts to normal position when required.

Secured to the framework of the car is another frame formed by the bars E and cross-braces $e'$, to which are secured the electromagnets M. These magnets are constructed in a way to assure a long pull without diminishing the power, as shown by Fig. 2, where it will be seen that a series of several magnets are arranged in sequence, having their respective armatures arranged at different distances from their poles, so that they reach the poles at different times and working together make a long stroke with full power of the magnets. Such an arrangement makes it possible to operate a brake with a magnet.

$e^2 \; e^2$ are brackets secured to a suitable portion of the frame, and to these brackets are pivoted the bell-crank levers $e^3$.

The two combination-magnets M are secured to the frame so that they lie at right angles to the car-body, and the armature-rods actuated by the magnets are connected with one end of the bell-crank levers $e^3$, whose other ends are joined by the rods F to the cross-pieces B, which carry the brake-shoes S. The car is thus provided with a brake operated by hand and also by the magnet M.

The current for charging the coils of the magnets may be taken from that supplied to the motor of the car or from a battery carried upon the car.

What I claim, and desire to secure by Letters Patent, is—

In a brake-operating mechanism for vehicles, the cross-pieces B carrying the brake-shoes, and operating connections therewith leading to the platform, in combination with a long-pull combination-electromagnet mounted upon a frame and lying crosswise of the car; the pivoted bell-crank levers $e^3$, having one arm connected with the armature-rod; the rods F each connected at one end with the other arm of one of the bell-crank levers, and at the other end with one of the cross-pieces B, means for supplying an electric current to the coils of the magnets and the springs $b'$, for restoring the parts to normal position substantially as described.

Signed at New York, in the county of New York and State of New York, this 1st day of August, A. D. 1899.

ANTON DUPPLER.

Witnesses:
M. TURNER,
J. H. RICHMOND.